United States Patent
Kuo (10) Patent No.: US 11,481,048 B2
(45) Date of Patent: Oct. 25, 2022

(54) TOUCHPAD MECHANISM

(71) Applicant: Acer Incorporated, New Taipei (TW)

(72) Inventor: Yan-Lin Kuo, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 17/518,117

(22) Filed: Nov. 3, 2021

(65) Prior Publication Data

US 2022/0283652 A1 Sep. 8, 2022

(30) Foreign Application Priority Data

Mar. 2, 2021 (TW) .................................. 110202212

(51) Int. Cl.
*G06F 3/041* (2006.01)
*G06F 3/0354* (2013.01)

(52) U.S. Cl.
CPC ................................. *G06F 3/03547* (2013.01)

(58) Field of Classification Search
CPC .... G06F 1/169; G06F 1/1692; G06F 3/03547; G06F 3/041
USPC ........................................................ 345/173
See application file for complete search history.

(56) References Cited

U.S. PATENT DOCUMENTS

| | | | | |
|---|---|---|---|---|
| 8,139,347 B2* | 3/2012 | Chiang | ................... | G06F 1/169 |
| | | | | 361/679.55 |
| 8,803,852 B2* | 8/2014 | Tsai | ....................... | G06F 1/169 |
| | | | | 345/184 |
| 8,866,033 B2* | 10/2014 | Xue | ....................... | G06F 1/169 |
| | | | | 200/343 |
| 9,465,416 B2* | 10/2016 | Shen | ..................... | G06F 1/1692 |
| 10,496,201 B2* | 12/2019 | Chen | ....................... | G06F 3/041 |
| 2010/0103611 A1* | 4/2010 | Yang | ....................... | G06F 1/169 |
| | | | | 361/679.55 |
| 2010/0300772 A1* | 12/2010 | Lee | ..................... | G06F 3/03547 |
| | | | | 200/329 |
| 2014/0313648 A1* | 10/2014 | Yang | ....................... | G06F 1/169 |
| | | | | 361/679.01 |
| 2017/0038801 A1* | 2/2017 | Lee | ......................... | G06F 3/041 |

* cited by examiner

*Primary Examiner* — Joe H Cheng (74) *Attorney, Agent, or Firm* — McClure, Qualey & Rodack, LLP (57) ABSTRACT

A touchpad mechanism is provided, including a touchpad module, a rectangular support affixed to the touchpad module, and a frame receiving the touchpad module and the support. The frame has a hole and a guiding structure protruding from the edge of the hole. A hook portion of the support extends through the hole and contacts the guiding structure, so as to restrict the touchpad module and the support in the frame.

10 Claims, 11 Drawing Sheets

TOUCHPAD MECHANISM

CROSS REFERENCE TO RELATED APPLICATIONS

This application claims priority of Taiwan Patent Application No. 110202212 filed on Mar. 2, 2021, the entirety of which is incorporated by reference herein.

BACKGROUND OF THE INVENTION

Field of the Invention

The application relates in general to a touchpad mechanism, and in particular, to a touchpad mechanism that has a support with a hook portion.

Description of the Related Art

Conventional laptop computers usually have a touchpad so that the user can control the cursor on the screen or input instructions to the computer. Accurate position detection by the touchpad is highly desirable for the manufacturer. In particular, when the user pushes the touchpad to perform a click action, the forces exerted on different positions of the touchpad should be equal as much as possible, so as to prevent ambiguous haptic feedback of the touchpad and incorrect instructions to the computer.

Additionally, a traditional touchpad mechanism usually has sheet springs or other resilient elements. However, when the user pushes the touchpad to perform a click action, these resilient elements, may cause undesired collisions and uncomfortable noise, thus reducing comfort during use.

Therefore, addressing the aforementioned problems has become a challenge.

BRIEF SUMMARY OF INVENTION

In view of the aforementioned problems, the object of the invention is to provide a touchpad mechanism that includes a touchpad module, a rectangular support affixed to the touchpad module, and a frame receiving the touchpad module and the support. The frame has a hole and a guiding structure protruding from the edge of the hole. A hook portion of the support extends through the hole and contacts the guiding structure, so as to restrict the touchpad module and the support in the frame.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the touchpad mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
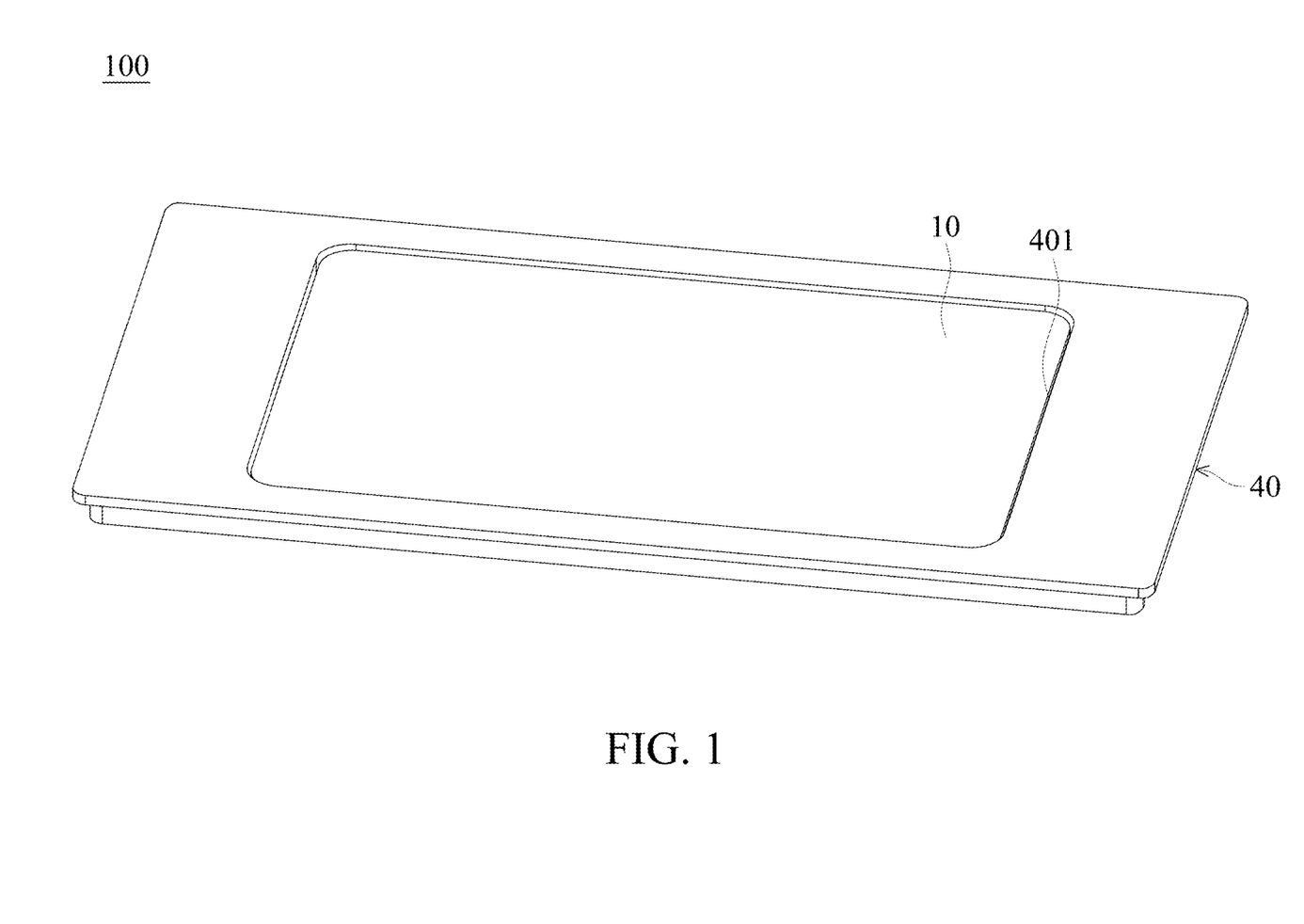
FIG. 1 is a perspective diagram of a touchpad mechanism 100 according to an embodiment of the invention.
Figure 2:
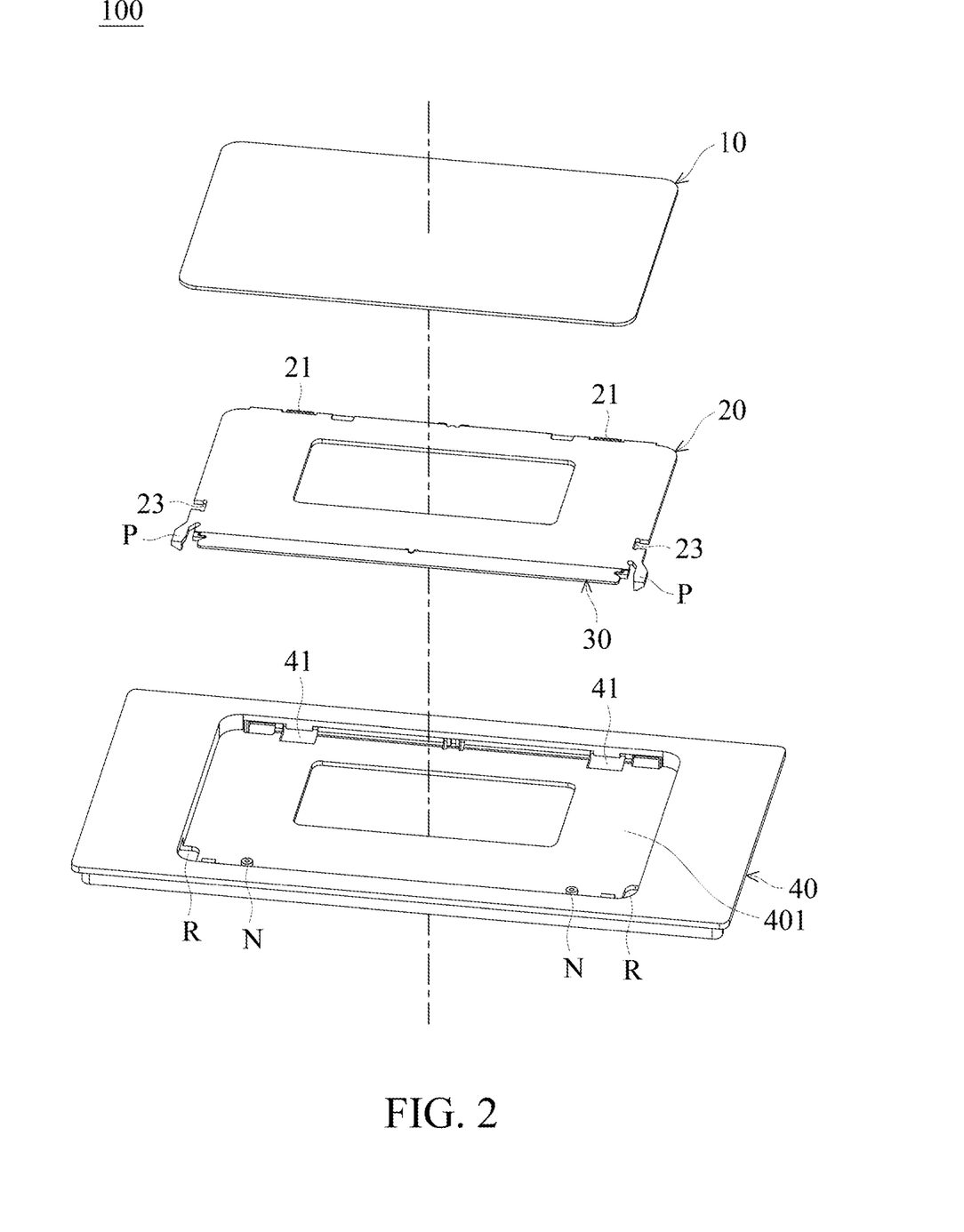
FIG. 2 is an exploded diagram of the touchpad mechanism 100 in FIG. 1.
Figure 3:
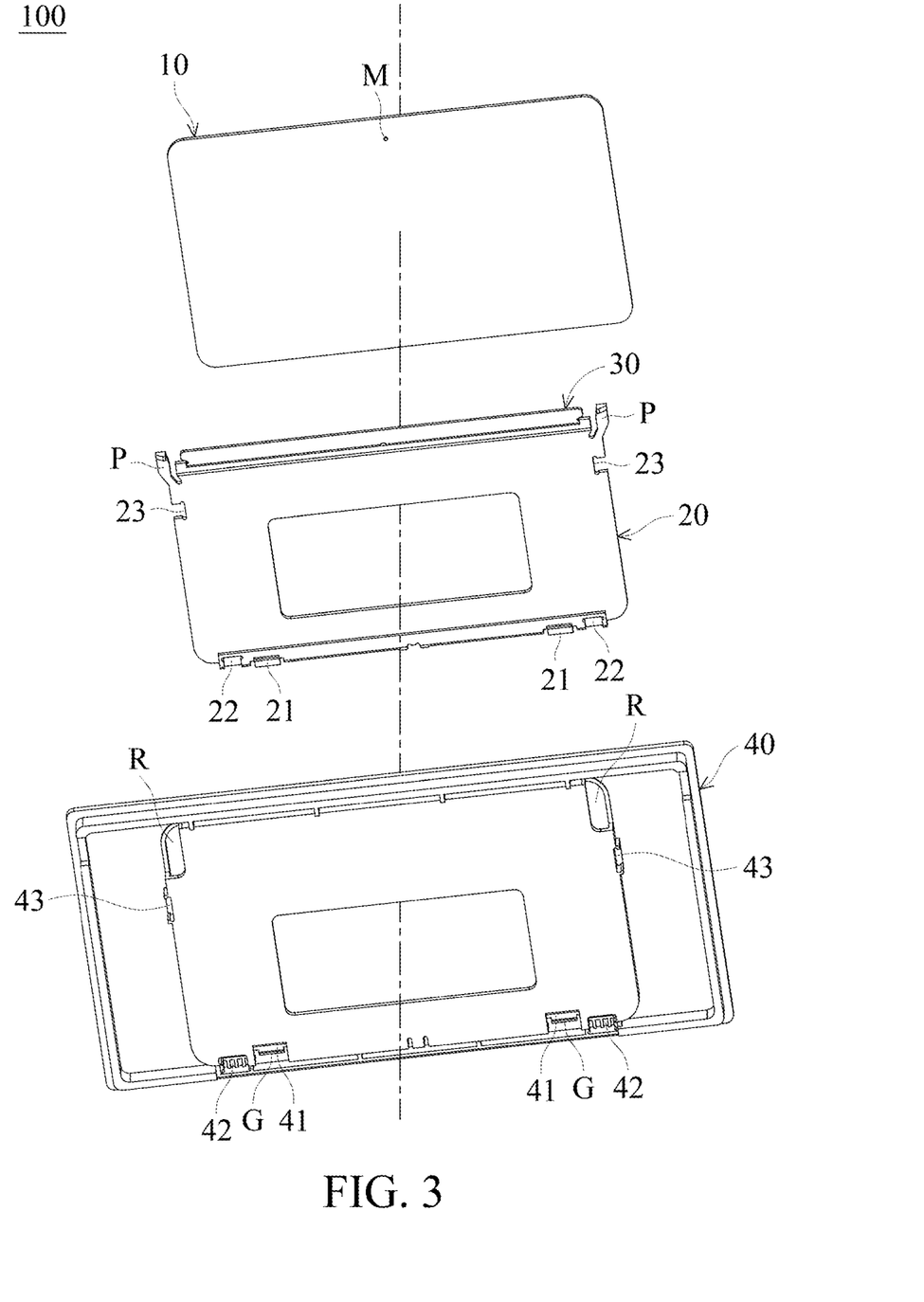
FIG. 3 is another exploded diagram of the touchpad mechanism 100 in FIG. 1.
Figure 4:
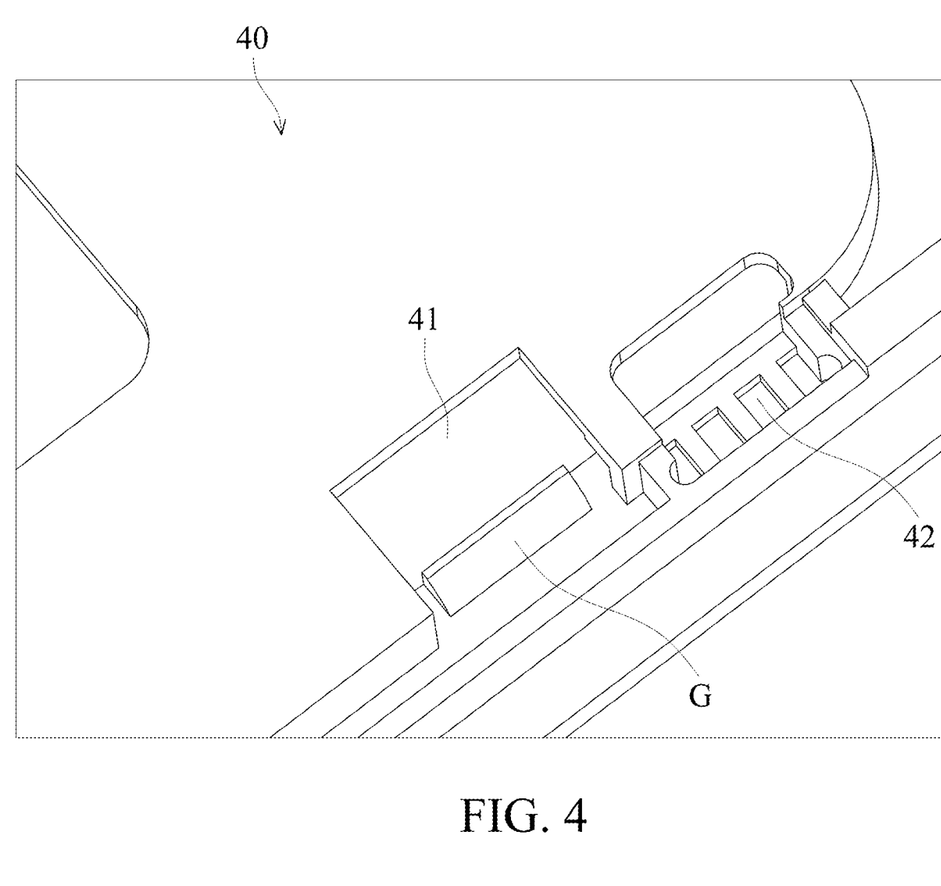
FIG. 4 is a partial enlarged view of the frame 40.
Figure 5:
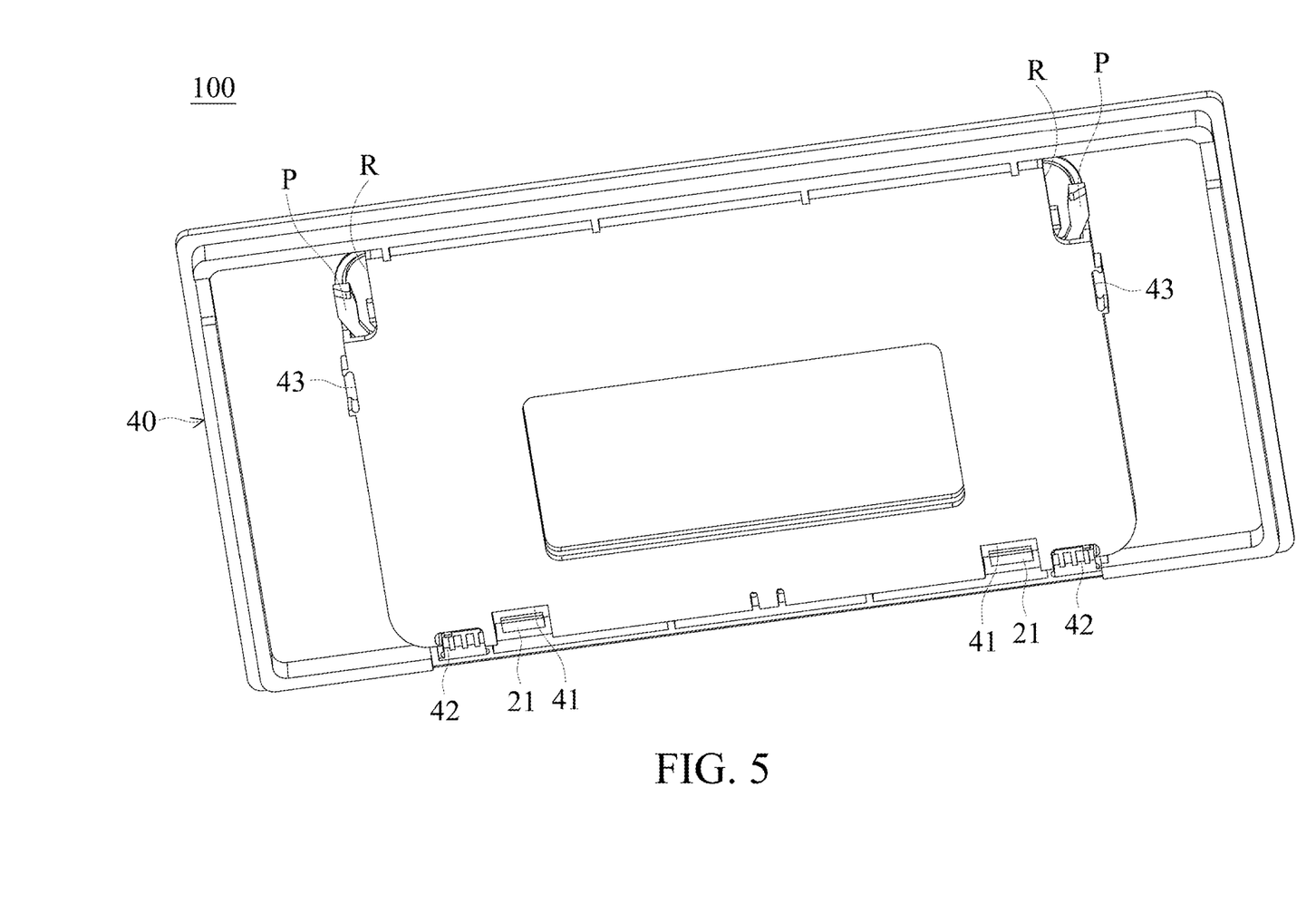
FIG. 5 is another perspective diagram of the touchpad mechanism 100 in FIG. 1.

FIG. 1 is a perspective diagram of a touchpad mechanism 100 according to an embodiment of the invention. FIG. 2 is an exploded diagram of the touchpad mechanism 100 in FIG. 1. FIG. 3 is another exploded diagram of the touchpad mechanism 100 in FIG. 1. FIG. 4 is a partial enlarged view of the frame 40. FIG. 5 is another perspective diagram of the touchpad mechanism 100 in FIG. 1.

Referring to FIGS. 1-5, an embodiment of a touchpad mechanism 100 may be disposed in a laptop computer, including a touchpad module 10, a support 20, a longitudinal member 30, and a frame 40. In this embodiment, the frame 40 has a receiving space 401 for receiving the touchpad module 10, the support 20, and the longitudinal member 30. Here, the support 20 is adhered to the bottom side of the touchpad module 10, and the longitudinal member 30 is pivotally connected to a side of the support 20.

During assembly of the touchpad mechanism 100, the touchpad module 10, the support 20, and the longitudinal member 30 are disposed in the receiving space 401 of the frame 40, and the longitudinal member 30 abuts two protrusions N at the bottom of the receiving space 401. When the user pushes the top surface of the touchpad module 10, the longitudinal member 30 is pressed by the protrusions N and rotates relative to the support 20, so that a switch element M on the bottom side of the touchpad module 10 is triggered (FIG. 3). Therefore, the user can perform a click action on a menu or input instructions by pushing the touchpad module 10.

In this embodiment, the switch element M may comprise a metal dome switch, and the position of the switch element M along the long axis of the longitudinal member 30 is between the two protrusions N. Hence, the longitudinal member 30 can be used as a movable lever to trigger the switch element M. With the longitudinal member 30 provided in the touchpad mechanism 100, the user can exert substantially the same force on different positions of the touchpad module 10 to perform a click action, thereby preventing ambiguous haptic feedback of the touchpad mechanism 100 and improving comfort during use.

As shown in FIGS. 2-5, two openings R are formed at the corners of the receiving space 401 of the frame 40, and two cantilevers P are formed on opposite sides of the support 20. It should be noted that the support 20 has a rectangular structure, and the cantilevers P and the longitudinal member 30 are located on the same side (long side) of the support 20. During assembly, the cantilevers P are inserted through the openings R, so that the touchpad module 10, the support 20, and the longitudinal member 30 can be prevented from being separated from the receiving space 401 of the frame 40.

Additionally, two hook portions 21 are formed on another long side of the support 20, and the frame 40 forms two holes 41 communicated with receiving space 401. During assembly of the touchpad mechanism 100, the hook portions 21 of the support 20 respectively extend through the holes 41 of the frame 40 (FIG. 5), thus preventing separation of the touchpad module 10, the support 20, and the longitudinal member 30 from the receiving space 401.

Specifically, the frame 40 further forms two guiding structures G respectively protruding from the edges of the holes 41. Each of the guiding structures G has a curved surface to contact and guide the hook portion 21 to slide through the hole 41 of the frame 40. In this embodiment, when the user pushes the top surface of the touchpad module 10, the touchpad module 10 and the support 20 descend to the bottom of the receiving space 401, and the hook portions 21 of the support 20 slide along the curved surfaces of the guiding structures G. Here, the hook portions 21 of the support 20 and the guiding structures G of the frame 40 can constitute a hinge module, so that the touchpad module 10 and the support 20 are held and retained in the receiving space 401.

Figure 6:
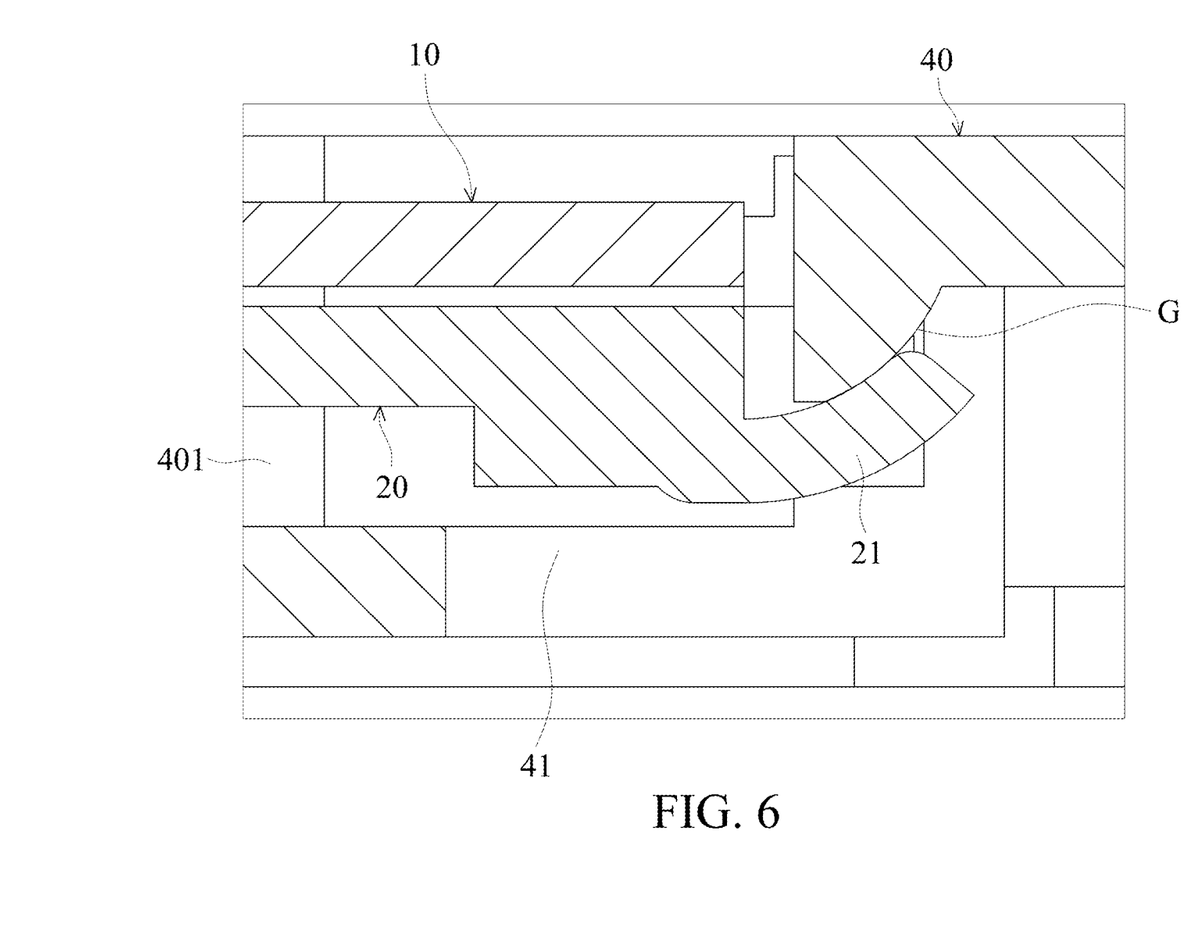
FIG. 6 is a partial cross-sectional view of the touchpad mechanism 100 in FIG. 1.

FIG. 6 is a partial cross-sectional view of the touchpad mechanism 100 in FIG. 1. As shown in FIG. 6, the touchpad module 10, the support 20, and the longitudinal member 30 are located in the receiving space 401 of the frame 40 after assembly of the touchpad mechanism 100, wherein the hook portions 21 of the support 20 respectively extend through the holes 41 of the frame 40 to hook on the guiding structures G.

Since each of the hook portions 21 of the support 20 has a curved structure, and each of the guiding structures G has a curved surface to contact and guide the hook portion 21 to slide through the hole 41 of the frame 40, they can be used as a hinge module when the user pushes the touchpad module 10 toward the bottom of the receiving space 401, thereby facilitating a stable and smooth movement between the touchpad module 10 and the frame 40.

Still referring to FIGS. 2-5, two recesses 22 are formed on a long side of the rectangular support 20 (FIG. 3), and another two recesses 23 are respectively formed on the two short sides of the support 20. The recesses 22 and 23 are configured to accommodate magnets, electromagnets, or other magnetic elements, wherein the recesses 22 are located close to the hook portions 21.

Similarly, two recesses 42 and two recesses 43 are formed on the frame 40 (FIGS. 3 and 5) for accommodating magnets, electromagnets, or other magnetic elements, wherein the recesses 42 are located adjacent to the recesses 22 of the support 20, and the recesses 43 are located adjacent to the recesses 32 of the support 20 after assembly.

It should be noted that the magnetic elements disposed on the support 20 and the frame 40 can generate appropriate magnetic forces so that the touchpad module 10 floats and remains in an initial position of the receiving space 401, thus preventing collisions between different components. Additionally, after the user pushes the touchpad module 10, the touchpad module 10 can automatically and rapidly bounce back to the initial position by magnetic force. Hence, there is no need to provide coil spring, sheet spring or other resilient elements in the touchpad mechanism 100, thereby saving space and production cost.

Figure 7:
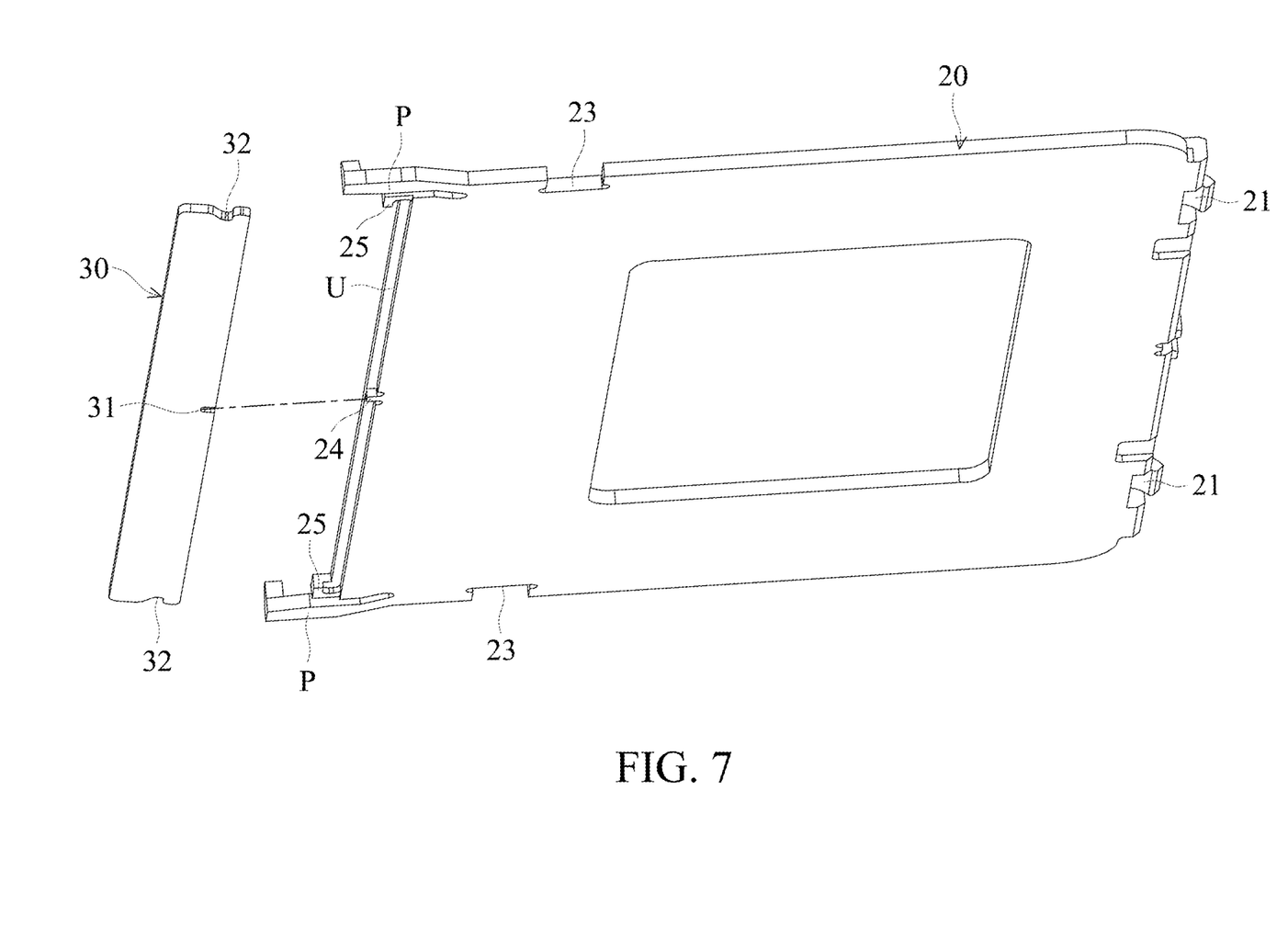
FIG. 7 is an exploded diagram of the support 20 and the longitudinal member 30 in FIGS. 2 and 3.
Figure 8:
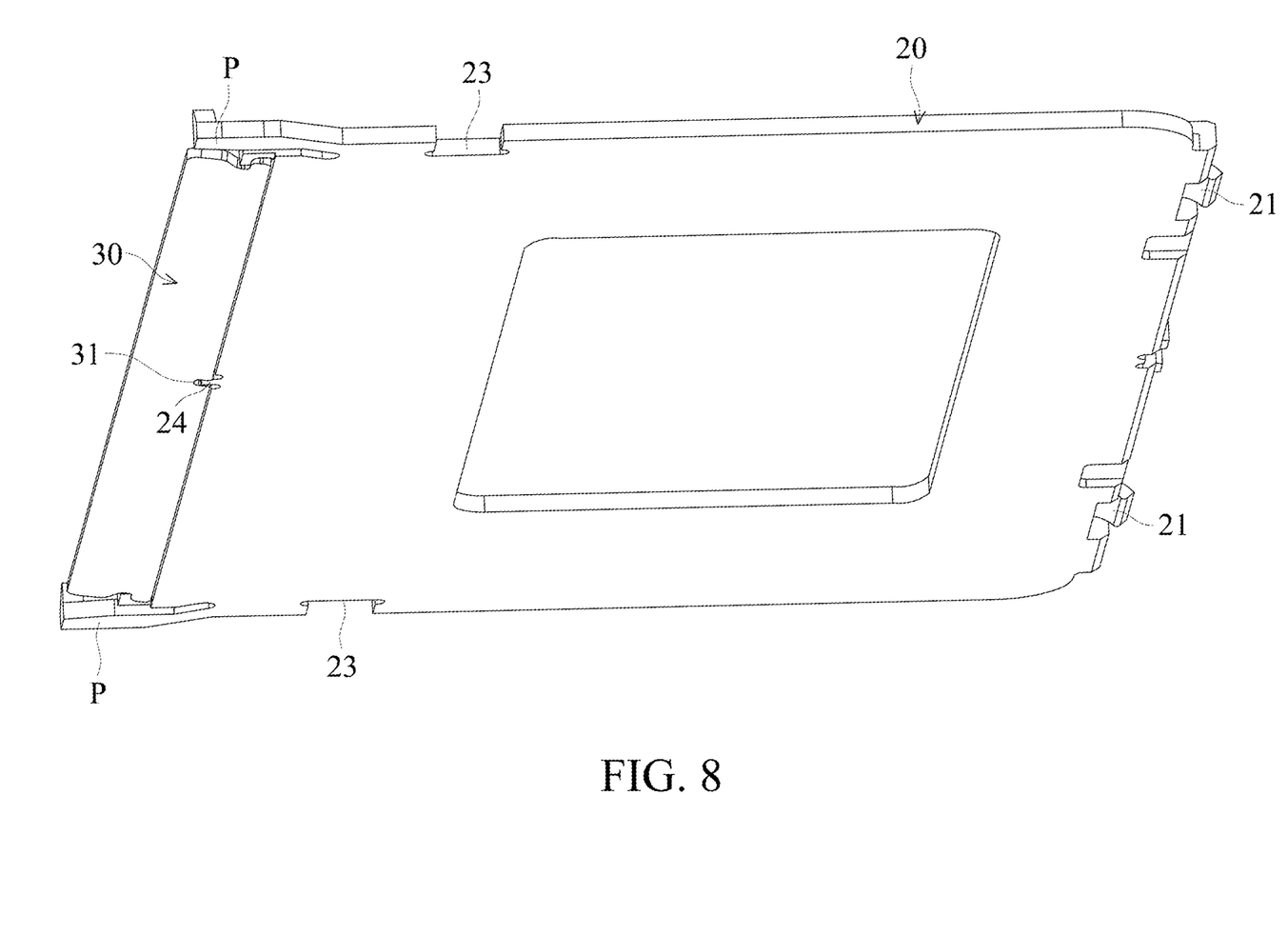
FIG. 8 is a perspective diagram of the support 20 and the longitudinal member 30 in FIG. 7 after assembly.
Figure 9:
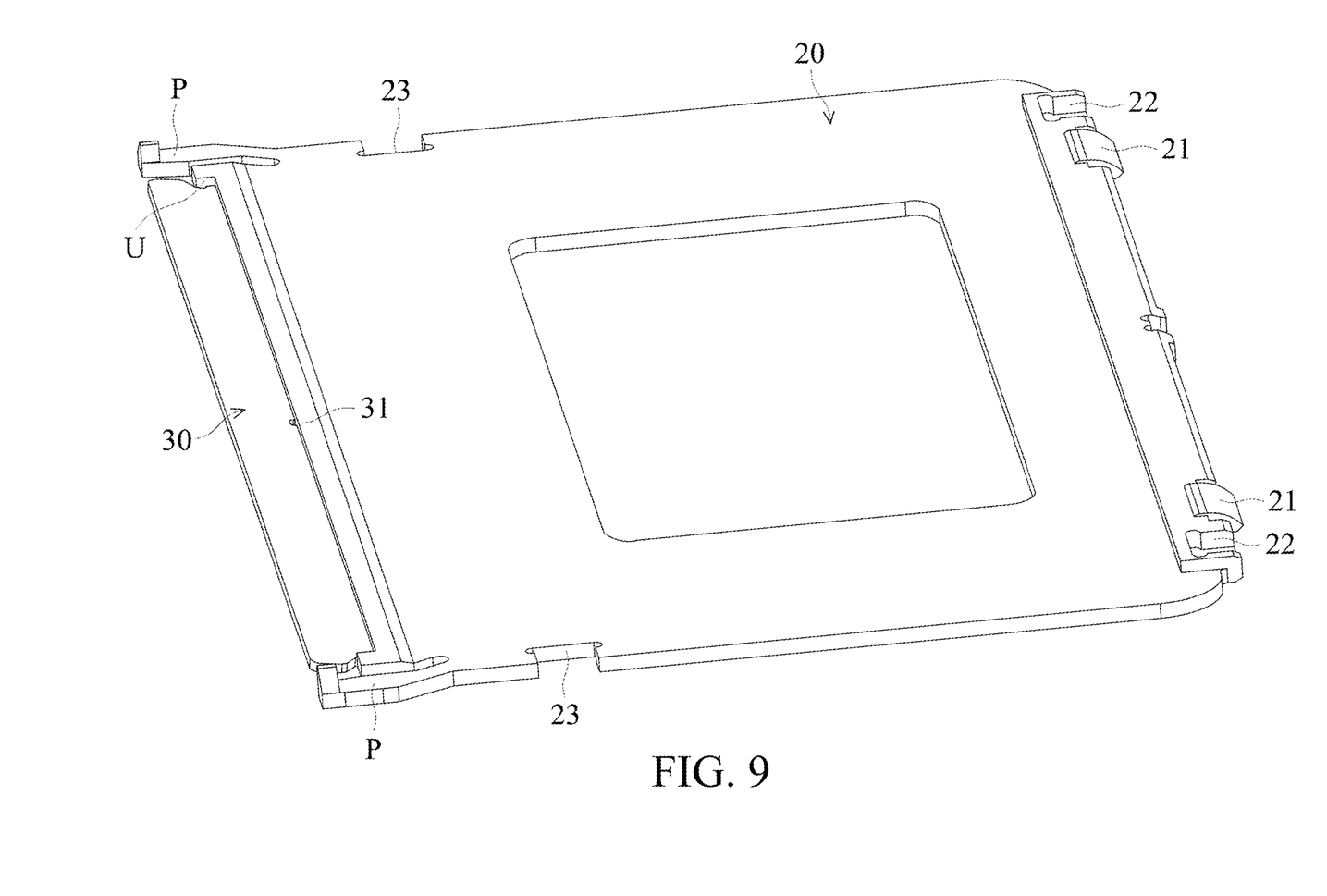
FIG. 9 is another perspective diagram of the support 20 and the longitudinal member 30 in FIG. 7 after assembly.

FIG. 7 is an exploded diagram of the support 20 and the longitudinal member 30 in FIGS. 2 and 3. FIG. 8 is a perspective diagram of the support 20 and the longitudinal member 30 in FIG. 7 after assembly. FIG. 9 is another perspective diagram of the support 20 and the longitudinal member 30 in FIG. 7 after assembly.

As shown in FIGS. 7-9, a recessed portion U is formed on a long side the support 20. A positioning block 24 is formed at the center of the recessed portion U, and two nubs 25 are formed at two ends of the recessed portion U. Moreover, a notch 31 is formed at the center of the longitudinal member 30, and two cavities 32 are formed at two ends of the longitudinal member 30, corresponding to the positioning block 24 and the nubs 25.

During assembly, a part of the longitudinal member 30 is received in the recessed portion U, and the positioning block 24 of the support 20 is engaged in the notch 31 of the longitudinal member 30, so as to prevent horizontal movement of the longitudinal member 30 relative to the support 20. Additionally, the nubs 25 at the ends of the recessed portion U are pivotally received in the cavities 32 at the ends of the longitudinal member 30, so that the longitudinal member 30 is hinged on the support 20. When the user pushes the touchpad module 10, the longitudinal member 30 is pressed by the protrusions N (FIG. 2) and rotates relative to the support 20, whereby a switch element M on the bottom side of the touchpad module 10 is triggered (FIG. 3). Hence, the user can click on a menu or input instructions by pushing the touchpad module 10.

Figure 10:
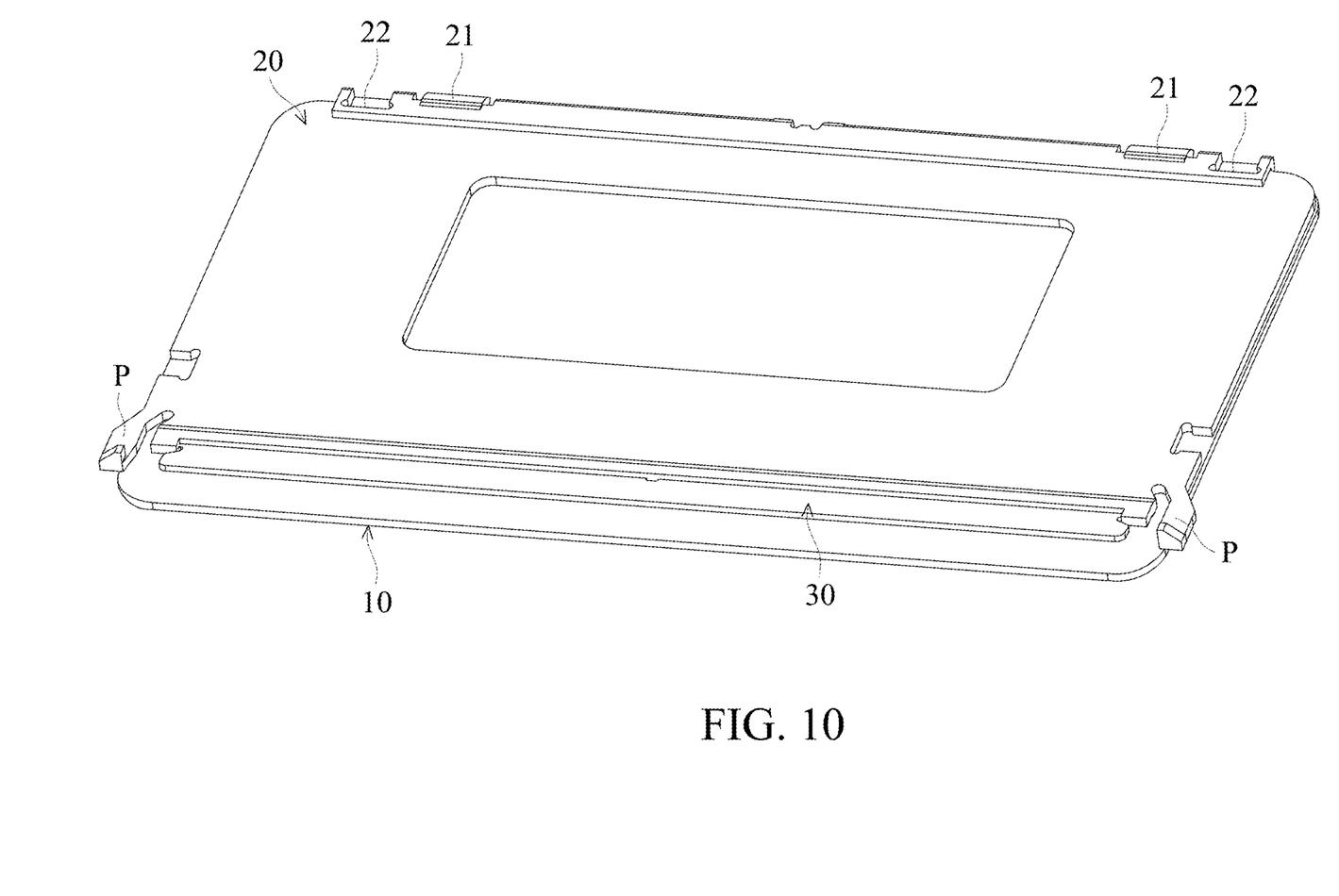
FIG. 10 is a perspective diagram of the touchpad module 10, the support 20, and the longitudinal member 30 in FIGS. 2 and 3 after assembly.
Figure 11:
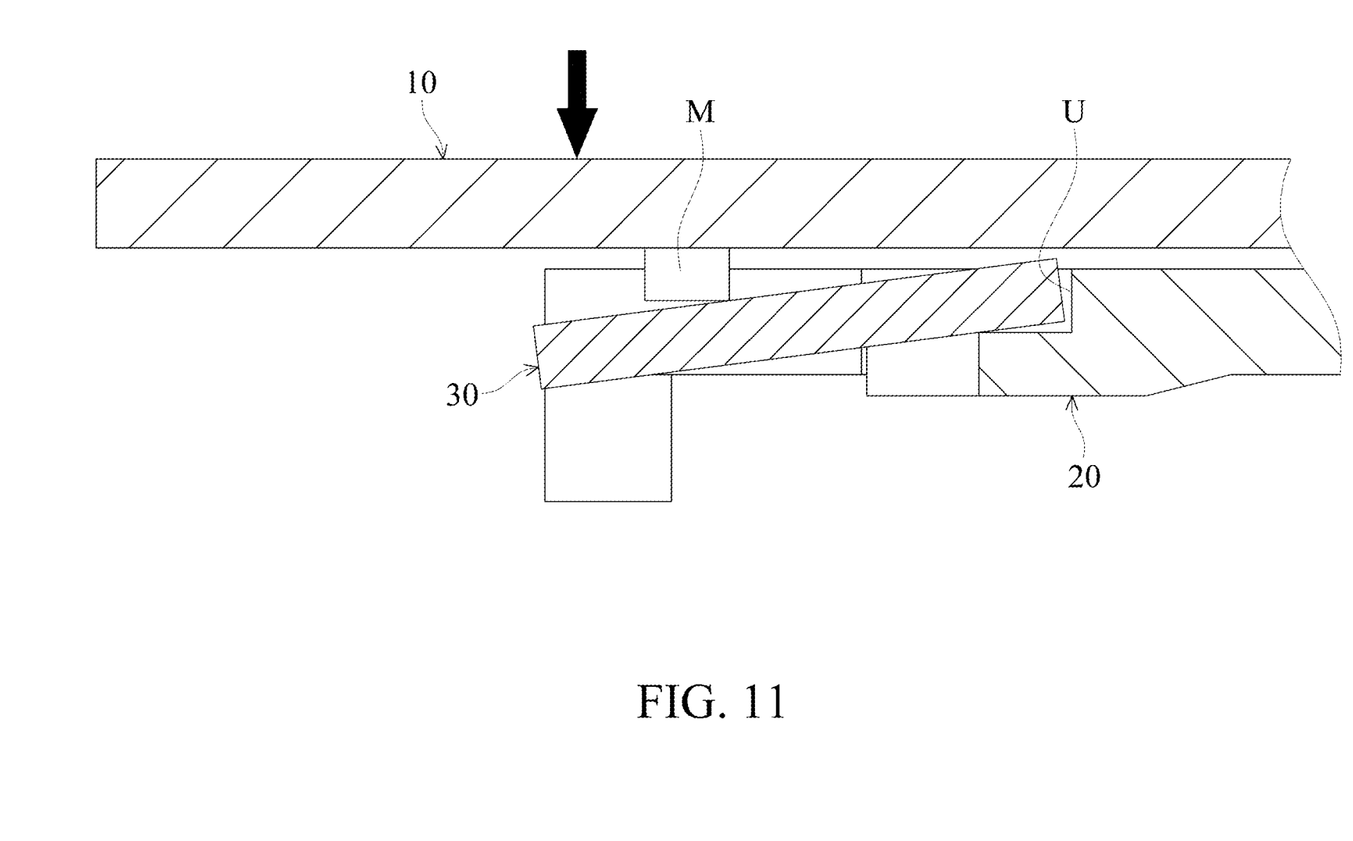
FIG. 11 is a partial cross-sectional view of the touchpad module 10, the support 20, and the longitudinal member 30 in FIG. 10 after assembly.

FIG. 10 is a perspective diagram of the touchpad module 10, the support 20, and the longitudinal member 30 in FIGS. 2 and 3 after assembly. FIG. 11 is a partial cross-sectional view of the touchpad module 10, the support 20, and the longitudinal member 30 in FIG. 10 after assembly.

Referring to FIGS. 10 and 11, the support 20 is adhered to the bottom side of the touchpad module 10, wherein the width of the support 20 is less than that of the touchpad module 10. Here, the longitudinal member 30 is pivotally connected to the support 20, wherein the hook portions 21 are located on opposite sides of the support 20, and the cantilevers P and the longitudinal member 30 are located on the same side (long side) of the support 20.

As shown in FIG. 11, when the touchpad module 10 is in an initial position of the receiving space 401, the longitudinal member 30 is angled with respect to the touchpad module 10. When the user pushes the top surface of the touchpad module 10, as the arrow indicates in FIG. 11, the longitudinal member 30 is pressed by the protrusions N and rotates relative to the support 20. Therefore, the switch element M on the bottom side of the touchpad module 10 can be triggered by the longitudinal member 30, so that the user can click on a menu or input instructions to the computer by pushing the touchpad module 10.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A touchpad mechanism, comprising:
   a touchpad module;
   a rectangular support, affixed to a bottom side of the touchpad module and having a hook portion; and
   a frame, having a receiving space, a hole communicated with the receiving space, and a guiding structure protruding from an edge of the hole;
   wherein the touchpad module and the support are received in the receiving space, and the hook portion of the support extends through the hole and contacts the guiding structure, thereby restricting the touchpad module and the support in the receiving space of the frame.

2. The touchpad mechanism as claimed in claim 1, wherein the guiding structure has a curved surface, and the hook portion has a curved structure sliding along the curved surface when the touchpad module is pushed by an external force.

3. The touchpad mechanism as claimed in claim 1, wherein the touchpad mechanism further comprises a switch element and a longitudinal member, and the frame further has two protrusions, wherein the switch element is movably disposed on the bottom side of the touchpad module, the longitudinal member is connected to the support, and the protrusions are located at a bottom of the receiving space, so that when the touchpad module is pushed by an external force, the longitudinal member is pressed by the protrusions and rotates relative to the support, whereby the switch element is triggered.

4. The touchpad mechanism as claimed in claim 3, wherein the support further has a recessed portion, and the longitudinal member is disposed in the recessed portion, wherein the longitudinal member and the hook portion are located on opposite sides of the support.

5. The touchpad mechanism as claimed in claim 4, wherein the longitudinal member has a notch, and the support further has a positioning block, wherein the positioning block is located at a center of the recessed portion and is engaged in the notch of the longitudinal member.

6. The touchpad mechanism as claimed in claim 4, wherein the longitudinal member has two cavities, and the support further has two nubs located at opposite ends of the recessed portion and received in the cavities.

7. The touchpad mechanism as claimed in claim 3, wherein the frame further has an opening, and the support further has a cantilever extending through the opening.

8. The touchpad mechanism as claimed in claim 7, wherein the cantilever and the longitudinal member are located on the same side of the support.

9. The touchpad mechanism as claimed in claim 3, wherein the switch element is between the two protrusions along a long axis of the longitudinal member.

10. The touchpad mechanism as claimed in claim 1, wherein the touchpad mechanism further comprises two magnetic elements, and the frame and the support respectively have a recess for receiving the magnetic elements.

* * * * *